No. 857,042. PATENTED JUNE 18, 1907.
G. W. & E. E. EDWARDS.
ADJUSTING BOX.
APPLICATION FILED DEC. 15, 1906.

Witnesses,
Mrs. George Oxley.
P. B. Cole.

Inventors,
George W. Edwards.
Earnest E. Edwards.

UNITED STATES PATENT OFFICE.

GEORGE W. EDWARDS AND EARNEST E. EDWARDS, OF CAMBRIDGE, NEBRASKA.

ADJUSTING-BOX.

No. 857,042.　　　Specification of Letters Patent.　　　Patented June 18, 1907.

Application filed December 15, 1906. Serial No. 348,061.

*To all whom it may concern:*

Be it known that we, GEORGE W. EDWARDS and EARNEST E. EDWARDS, citizens of the United States, residing at Cambridge, in the county of Furnas and State of Nebraska, have invented new and useful Improvements in Adjusting-Boxes, of which the following is a specification.

Our invention relates to that class of boxes which are generally used on connecting rods of engines, and on all cranks where adjustable boxes are used; and the objects of our invention are, first, to provide a box with the means of adjusting itself automatically to the wrist pin or crank; second to get a more perfect adjustment than can be had with cotter keys or set screws: thus saving oil and wear on the boxes. Third to save the time consumed in adjusting the boxes with set screws or cotter keys, and to prevent the possibility of their working loose; and, fourth, to provide a means to do away with the necessity of filing the takeup on the boxes, and at the same time making them absolutely dust proof. We attain these objects in a simple and effectual manner by the mechanism illustrated and described in the accompanying drawing and specification.

Figure 1:
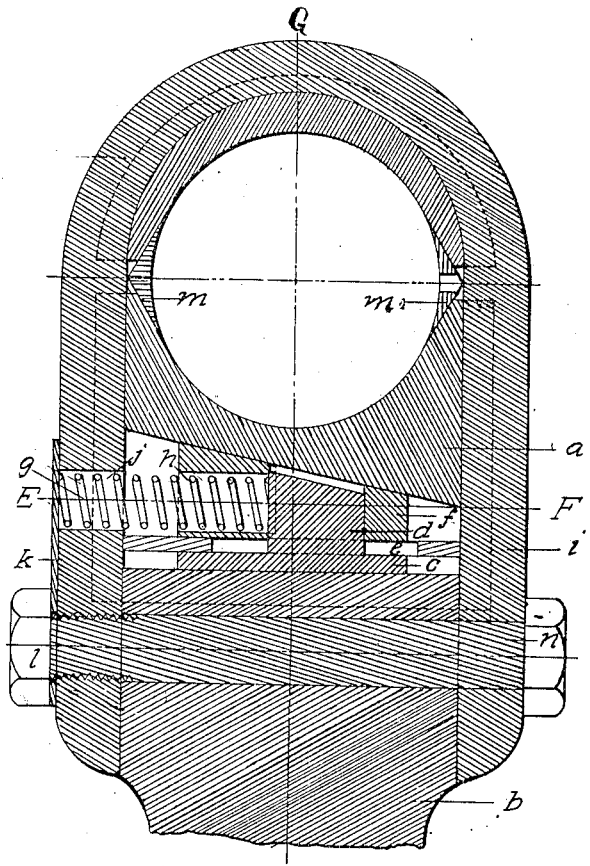
Figure 2:
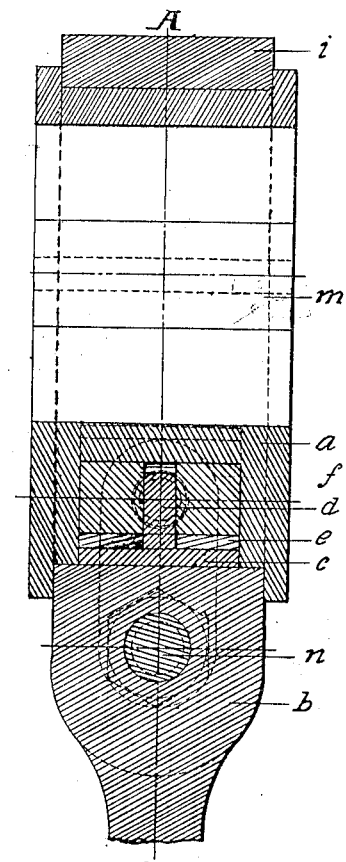
Figure 3:
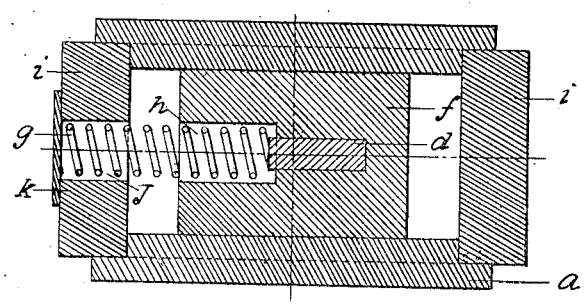

In the drawing, Figure 1, is a sectional view of the combined box; sectioned on the line, AB of Fig. 2. Fig. 2, is a section taken on the line, CD, of Fig. 1. Fig. 3, is sectioned on the line, EF, of Fig. 1.

The back of the box, *a*, is made on an incline. A combination friction gripping wedge is fitted in between this incline and the end of the rod, *b*; the combination friction gripping wedge is composed of a friction plate, *c*, provided with a lug, *d*, which extends through a supporting friction plate, *e*, and into a wedge, *f*; the wedge being provided with a hole to receive the lug.

A spring, *g*, acts through a hole, *h*, in the base of the wedge, *f*, meeting the slot-hole into which the lug, *d*, of plate, *c*, extends. The said spring acting against this lug raises the plate, *c*, together with the wedge, *f*, carried on the lug, *d*, on the inclined back of the box and pushes the box against the wrist pin or crank; thus making a perfect adjustment. The adjustment is held by the friction on both surfaces of the supporting friction plate, *e*, and the end of the rod, *b*. The supporting friction plate touches the box frame, *i*, at both ends, thus preventing the wedge from jumping up and down and allowing the box to have play. The spring, *g*, is put in place through the hole, *j*, in the box frame, *i*, and is held in place by the plate, *k*, which is held by the lock nut, *l*.

Dust proof wear-out-wedges, *m*, are placed between the two halves of the box. The half boxes are made to meet these wear-out-wedges on an incline; so that when they are pushed together in taking up wear, the wear-out-wedges are forced against the wrist pin or crank, thus wearing them off enough to allow the box to take up wear; and at the same time making them absolutely dust proof.

The box frame, *i*, is made fast to the connecting rod by means of the bolt, *n*, thus making it convenient for taking apart when necessary.

We are aware that prior to our invention, adjusting boxes have been made with an incline on the back for the purpose of taking up wear. We therefore do not claim them broadly, but

We claim:

1. The combination, with the halves of a bearing box, the back of one of which halves is formed with an inclined surface, and a relatively stationary support, of a wedge formed with apertures therein and bearing against said surface, a plate having a lug projecting in one of said apertures, and a spring pressing against said lug, substantially as set forth.

2. The combination, with the halves of a bearing box, of wear-out-wedges meeting the two halves of the box on an incline, and an automatic take up wedge for pressing the halves of the box together.

GEORGE W. EDWARDS.
　　　　EARNEST E. EDWARDS.

Witnesses:
　Mrs. G. A. OXLEY,
　P. B. COLE.